US005642564A

United States Patent [19]

Lund-Hansen

[11] Patent Number: 5,642,564

[45] Date of Patent: Jul. 1, 1997

[54] METHOD OF JOINING STIFF PLATE PROFILE MEMBERS INTO BROAD LAMELLAE OR PANELS

[76] Inventor: Kjeld Balslev Lund-Hansen, Krajbjergvej 3, DK-8541, Sködstrup, Denmark

[21] Appl. No.: 504,667

[22] Filed: Jul. 20, 1995

Related U.S. Application Data

[63] Continuation of Ser. No. 245,471, May 18, 1994, abandoned, which is a continuation of Ser. No. 689,780, filed as PCT/DK89/00274 Nov. 17, 1989, abandoned.

[30] Foreign Application Priority Data

Nov. 17, 1988 [DK] Denmark .................................. 6410/88

[51] Int. Cl.[6] ...................................................... B23P 11/02

[52] U.S. Cl. .................................... 29/897.32; 29/525.01; 52/584.1; 52/588.1; 52/461

[58] Field of Search ............................ 29/897.32, 525.01, 29/525.08; 52/459, 460, 461, 580, 581, 584.1, 588.1, 589.1, 592.1, 239, 238.1, 240, 242, 741.1, 745.19

[56] References Cited

U.S. PATENT DOCUMENTS

| | | | |
|---|---|---|---|
| 1,913,342 | 6/1933 | Schaffert | 52/588.1 |
| 2,103,407 | 12/1937 | Dean | 52/461 |
| 2,412,253 | 12/1946 | Diggs | 29/897.32 |
| 3,119,173 | 1/1964 | Glaser | 29/897.32 |
| 3,462,819 | 8/1969 | Gregoire | 29/897.32 |
| 3,789,567 | 2/1974 | Rae et al. | 52/584.1 |
| 4,104,837 | 8/1978 | Naito | 52/588.1 |
| 4,635,422 | 1/1987 | Nowack et al. | 52/461 |
| 5,033,147 | 7/1991 | Svensson | 52/588.1 |
| 5,491,943 | 2/1996 | Vondrejs et al. | 52/239 |

FOREIGN PATENT DOCUMENTS

| | | | |
|---|---|---|---|
| 248701 | 1/1903 | Australia | 52/238.1 |
| 487704 | 6/1952 | Canada | 52/584.1 |
| 422082 | 6/1948 | Italy | 52/584.1 |
| 2126106 | 3/1984 | United Kingdom | 52/588.1 |

*Primary Examiner*—David P. Bryant

*Attorney, Agent, or Firm*—Antonelli, Terry, Stout & Kraus, LLP

[57] ABSTRACT

A lamella or panel element and a method of making the same wherein plate profiles are provided along joining edges with cross flanges which, when the profiles are brought together edge to edge, engage each other in an interlocking manner in a transverse direction. The flange portions are locked together by inserting a U-shaped or C-shaped profiled joining member which engages the outside of the flange portions on the side edges with a loose fit. The joining member may be inserted manually and extend over the length of the profiles and, the despite the loose fit, it is nevertheless possible to achieve a strong and tight joining since the long profiles do not extend totally rectilinearly. The joining members are arranged inside cavities of the plate profiles so that the joint members are invisible thereby resulting in advantageously obtaining an entirely smooth surface in the joining areas between the respective plate profiles.

11 Claims, 2 Drawing Sheets

METHOD OF JOINING STIFF PLATE PROFILE MEMBERS INTO BROAD LAMELLAE OR PANELS

This is a continuation of application Ser. No. 08/245,471 filed on May 18, 1994, now abandoned, which is a continuation of application Ser. No. 07/689,780, filed as PCT/DK89/00274 Nov. 17, 1989, now abandoned.

FIELD OF THE INVENTION

The present invention relates to a method of joining hollow, extruded profiled plate lengths for the formation of broad lamellae or panels, e.g. broad lamella constructions for sun shading systems.

BACKGROUND OF THE INVENTION

For certain applications, for example, for broad lamellae in sun shading systems, it would be desirable to make use of flat and broad, hollow profiles of extruded aluminium, but as well known it is difficult and expensive to produce such extrusions with a width exceeding some 30 cm. Of course it is possible to join such profiles edgewise, by, for example, use of joining fishes or by welding, but these methods are both expensive and unsuitable, as the ideal is to produce a reasonably smooth and uniform surface on the assembled lamella.

An immediately more attractive solution has already been proposed, namely to take advantage of the extrusion technique to the effect that the single profile plates are manufactured with tongue-and-groove-systems along the edges, such that the profiles can be joined by a lengthwise pushing together. It has been found, however, that such a joining method, which may well be realistic in connection with profile elements of short lengths, is not realistic when the length of the profiles is of the magnitude 5 m, e.g. 3–7 m. The long profile elements will have to be reasonably stiff, and even though they are produced with all care they will, however, inevitably come up with such minor wrynesses over the long length which may not be visible at all, but in connection with the stiffness of the elements make it almost impossible to use the joining by a pushing together of the elements. The engagement portions could well be shaped with suitable tolerances, but the result would be that a few elements could be joined in an easy manner for obtaining a fixed joining, while the joinings between many other elements would not be fixed, which is entirely unacceptable. In many other cases an already initiated pushing-together joining would have to be stopped, e.g. upon three fourths of the joining movement having been carried out. Possibly many of the latter joinings could be accomplished anyway by an extra strong pressing together, but this will require a quite costly pressing equipment, and there would be considerable risks of skewnesses occurring in the joined structure.

According to another known and used technique advantage is still taken of the extrusion technique, namely, by shaping the profiles with complementary, barbed clamp surface portions, which can be brought into mutual engagement by a crosswise pressing together of the elements, such that the pressing movement shall be effected over a short distance only, but it is well known that this technique presents many problems as well as a rather high percentage of waste.

SUMMARY OF THE INVENTION

It is the purpose of the invention to provide a joining method, which can be effected in a simple and cheap manner for production of rigid joints with little if any waste.

According to the invention use is made of profile elements, the edge portions of which are shaped with interfacing engagement profile portions, which at each edge portion are provided on flange means projecting inwardly from the opposed other sides of the profile element with a free distance between the opposed engagement profile portions, with these portions being shaped such that, by a laying together of the profile elements edge to edge, they will interlock these elements in the transverse direction. The engagement profile portions are provided on flange means, which have a widening inside the profile element, such that, in their laid together condition, they will show a bilaterally widened head portion, with these head portions thus being located opposite to each other with a free space therebetween. For the joining of the profile elements is used an extra profile member shaped as a narrow plate strip, the opposed edges of which are provided with part-cylindrical flange portions of such cross sectional shapes that these flange portions, by an insertion of the extra profile member along the laid together engagement profile portions, can engage over the widened head portions so as to hold these together. Thus, it is sufficient to lay together the profile elements edge to edge and then push in the extra joining profile member for holding together the head portions consisting of the respective halves of the inwardly projecting flange means, such that the profile elements are hereby interiorly interlocked.

It is important that the extra joining profile member is not a thick block string, but a plate strip with part-cylindrical widenings along the outer edges, because this will be decisive for this profile member being to some degree flexible, such that when it is inserted it may adapt itself to a slightly curved run of the laid together edge portions of the plate profile elements, should such a run occur.

The outwardly open part-cylindrical flange portions of the joining profile member may well be designed with a certain oversize relative to the flange head portions which they shall surround. For a joint over a short length this will result in an undesired loose joint, but, when the joint is pronounced elongated and shows even the slightest deviations from an accurately linear shape, then the part-cylindrical flange portions will, at least at places, hold the edges of plate profile elements, tightly joined, whereby these elements as respective wholes, will engage each other in an entirely stable manner.

By practical experiments with commercially produced profile elements of aluminium it has been found that it is hereby possible to provide a completely firm edge joining between profile elements having a length of 6 meters by a quite untroubled, manual insertion of the joining profile members.

BRIEF DESCRIPTION OF THE DRAWINGS

The invention, which is defined in the appended claims, is described in more detail in the following with reference to the drawing, wherein:

DETAILED DESCRIPTION

Figure 1:
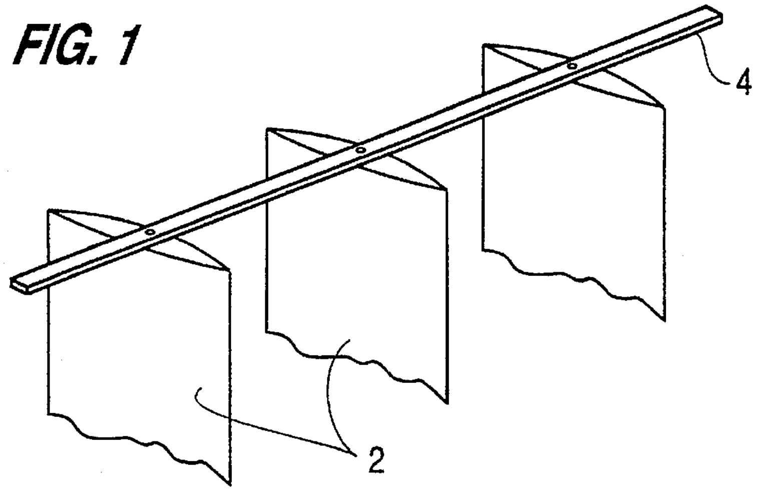
FIG. 1 is a perspective view of a few lamellae in a sun shading system.

In FIG. 1 is shown the upper ends of a few laminae 2 which are mounted in a rotatable manner between an upper supporting beam 4 and a corresponding lower beam or box (not shown), in which means (not shown) may be provided for concurrent turning of all the laminae for changing the angular positions thereof as desirable in a sun shading system. What is here concerned is heavy, large laminae with a width of, for example, 40–80 cm and with a length of some 2–8 meters. As these elements should be able to resist quite heavy wind forces and even other influences, they should be designed so as to be very stiff, and moreover they should be as light as possible. Also, their outer surfaces should be smooth. It could be close to hand to think of the elements as extruded aluminium profiles, but when their width is more than some 30 cm this is not an attractive possibility, while it is almost a practical impossibility if the width is 60 cm or more.

Figure 2:
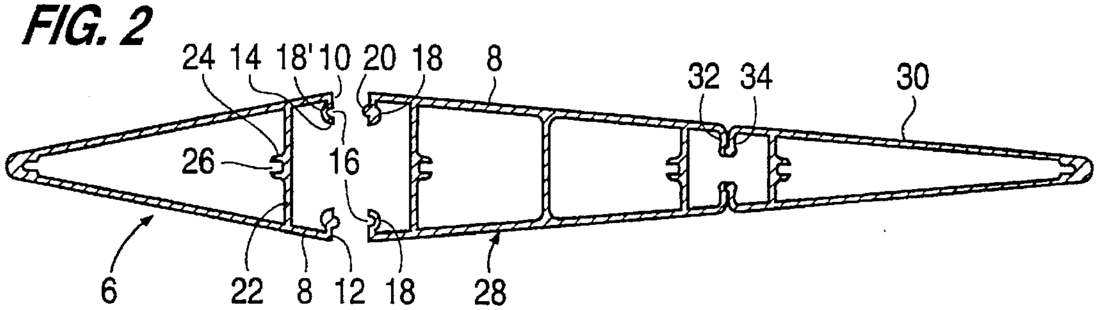
FIG. 2 is a sectional view of some adjoining profile elements for forming such lamellae.

As mentioned, therefore, it may be desirable to assemble the lamellae by edge joining of extruded profile elements, and FIG. 2 provides an example of such profiles, which are ready to be joined edge to edge. Outermost to the left is shown a V-shaped profile element 6, which at each of its opposed free edges of the side walls 8 is shaped with flange-portions 10 and 12 projecting inwardly towards each other. Along its free edge, the flange 10 is shaped with a cross sectionally half-circular portion 14 having a flange receiving groove 16 opening towards the right and an opposed outer side 18 of a part-circular configuration concentric with the groove 16. At its rear side the other flange portion 12 has a quite similar part-circular widening or flange portion 18', while at its front side it has forwardly projecting widening or rib portion 20 with a half-cylindrical cross section corresponding to the shape of the groove 16. At some distance inside its open end the V-profile element 6 is provided with a cross wall 22 having a projecting middle rib 24 shaped with a channel portion 26. Due to the cross wall 22 the profile element 6 will be a stiff hollow profile element.

Next to the profile element 6 is placed another profile element 28, of a trapezoidal shape, with the outer walls 8 and with cross walls 22. At its left hand end it is shaped exactly as a counterpart to the edge area of the profile element 6, i.e. with the flange portions 12,18', rib portion 20 located next to the half annular portion 14 and groove 16 of the profile element 6 and with its own half-circular portion 14 and groove 16 located next to the flange portion 12 and rib portion 20 of the profile element 6. At its opposite, right hand end the profile element 28 is shaped in a manner corresponding to the profile element 6, though, in the example illustrated, with a somewhat smaller distance between the opposed flange portions 14,16 and 18',20.

To the right of the profile element 28 is placed a further profile element 30, which is shaped fully similarly to the profile, only with a smaller width at its open edge, corresponding to the reduced edge width of the right hand end of the profile element 28. The profile element 30 is oriented such that the flange portions are located in a manner quite similar to their location at the left hand edge of the profile element 28.

The profile elements 28 and 30 are shown entirely laid together, with the rib portions 20 received in the grooves 16 by a purely transversely oriented pushing together of the profile elements 28,30. Thereby the profile elements 28,30 will engage each other lockingly in the transverse direction perpendicular to the pushing together direction. The radius of the rib portions 20 is slightly less than the radius of the groove 16, such that the relevant, respective engagements can be established along the entire length of the profile elements, also when the lengthwise direction of the edge portions is not linear in any absolute sense. It will be noted that the laid together profile flange portions will appear as inwardly protruding ribs 32 having circular-cylindrical widenings or heads 34 formed by the surface portions 18 and 18' on the flanges to be joined.

Figure 3:
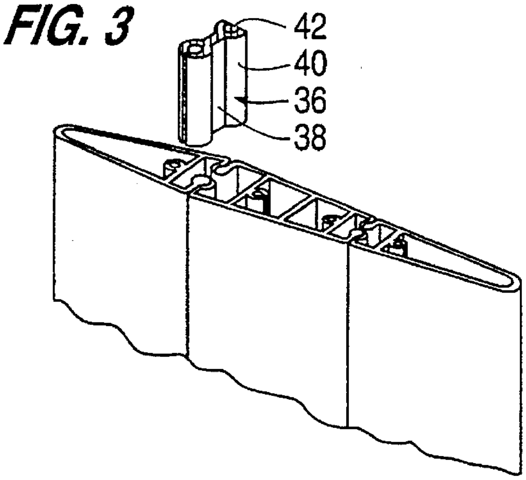
FIG. 3 is an exploded perspective view thereof.

As illustrated in FIG. 3 it is possible to thereafter lock together the portions forming the head portions 34, namely, by inserting a locking profile member 36 ever and along these head portions 34. The profile member 36 comprises an intermediate plate strip portion 38, the opposed longitudinal edges of which are provided with outwardly open, part-cylindrical flanges 40, which are adapted to surround the head portions 34, such that, by the insertion of the locking profile 36, the laid together head forming parts will be totally interlocked by their local engagement with the closely surrounding profile portions 40.

However, it is here very important that the local locking engagement should not be 'total' in each single cross section of the structure, as the inner diameter of the part cylindrical recess 42 in the flange portions 40 is slightly larger than the outer diameter of the head portions 34, e.g. with the ratio 4.5:4.0 mm. Purely locally, i.e. in each single cross section, this will be highly unacceptable, since even the slightest play in the joint will be inadmissible, but as already mentioned the circumstances are different when very long elements are to be joined. These will inevitably show small inaccuracies in their length directions, and by the insertion of the joining member 36 the overdimensioning will account for the advantageous effect that the joining member 36 is very easy to insert, preferably purely manually, and yet it will serve to establish a 'total' holding engagement at just some places along the entire length of the elements, this being sufficient to produce an entirely stiff joining of the respective neighbouring profile elements 6, 28 and 30.

Figure 4:
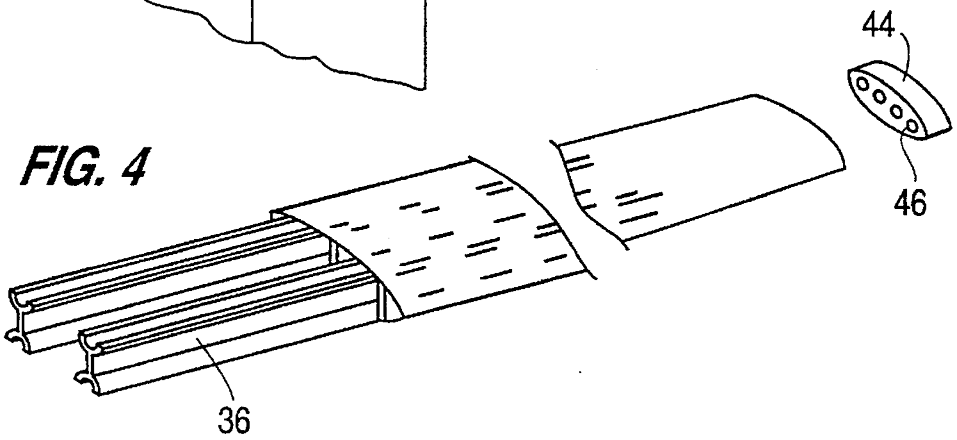
FIG. 4 is an exploded perspective view of a lamella when being assembled.

In FIG. 4 it is illustrated how the joining profile members 36 are inserted along the entire length of the edgewise joined plate profile elements 6, 28 and 30, and it should be noted that the lengths in question may be e.g. 2–8 meters, which are relatively high lengths. In FIG. 4 it is also shown that the ends of the joined profile elements may be covered by an end plate 44, in which holes 46 are provided for receiving bolts to be screwed into the ends of the hollow flange portions 24,26 on the cross walls 22 of the profiled elements, and, if the use of pivot pins is desired, such pins may be connected with these end plates.

The invention is not limited to the production of sun shading lamellae, as it may be applied generally wherever it is desired to join relatively narrow profile elements into broader lamella or panel structures. It will be appreciated that based on the profile elements shown in FIG. 2 it is possible to build up other lamella configurations, e.g. relatively narrow profiles by joining two elements 30 directly edge to edge or with use of two intermediate profiles 28, which are interconnected at their broad ends and are furthermore joined with end profiles 30 at both ends or edges.

Figure 5:
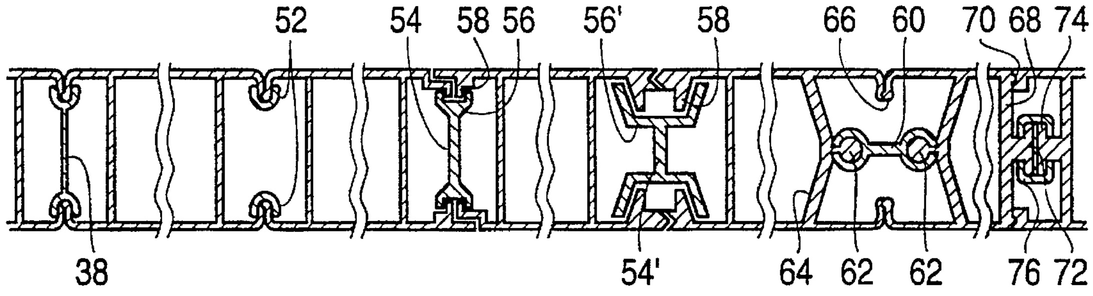
FIG. 5 is a sectional view of a panel element according to the invention.
Figure 6:
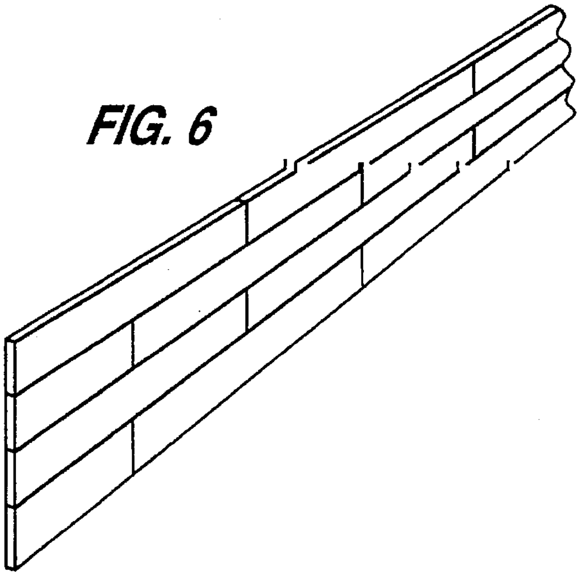
FIGS. 6 and 7 are perspective views of structures provided in accordance with the invention.
Figure 7:
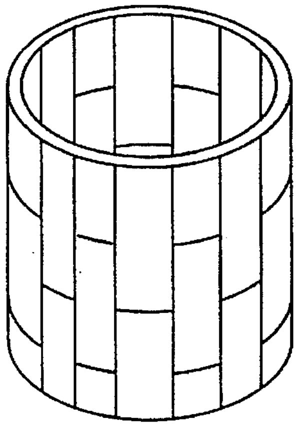

In FIG. 5 it is indicated that in a corresponding manner it is possible to join profile elements 50 having plan parallel outer sides into a structure having an unrestricted dimension in the cross direction, e.g. for the construction of very broad panel elements. It is also shown that the joining profiles 36 may be modified in various ways, e.g. in being replaced by singular embracing profiles 52 for the respective head portions 34, with the cross connection 38 between these profile portions being less important when fixed cross walls 22 are already present adjacent the joining areas, as these walls will hold together the edge portions of the profile elements with the desired spacing.

The joining profile portions 40 should not necessarily extend over more than 180°, as their primary function is to merely hold the head forming portions 34 together, against each other in the width direction of the assembled structure, while the holding together in the cross direction will be effected by the cross wall portions 22 of the profile elements. An example of this is shown in FIG. 5, where a connector profile 54 having U-shaped edge flanges 56 cooperates with inwardly protruding plate flanges 58 next to the edges of the profile elements, which are otherwise joined by an ordinary socket joint. At the right hand side of this joint another joint is shown, where the flanges 58' are mutually spaced, but held together by a correspondingly broader joining head 56' on the joining profile 54'; such a broad joining head, however, is not particularly advantageous, as it causes an increased stiffness of the joining profile, whereby the latter can less easily adapt itself to the slightly curved shape of the profile elements, whereby it may be more difficult to insert.

As shown in FIG. 5, a joining profile element 60 may extend in the plane of the profile elements and serve to hold together portions 62 which are projections on the edge walls 64 of the profile elements, whereby the outer edge areas will be held together at interengaging flange portions 66. At the outer right hand side of FIG. 5 another modification is shown, where the profile elements at one side do not have any edge recess, but are terminated by an end wall 68, along the edges of which there are provided engagement ribs 70 for guidingly receiving the side edges of the neighboring element. Between the opposed edge ribs 70 the edge wall 68 is at one or more places provided with a projecting T-profiled portion 72, which is held together with a corresponding profile portion 74 on the neighbouring element by joining profiles 76.

It should be mentioned that the use of the joining profiles, when these are inserted with considerable force for straightening the slight wryness of the elements, will act strongly reinforcing on the elements, whereby it will often be possible to make use of a thinner base material.

The elements can be surface treated before the joining, whereby no aftertreatment will be needed.

I claim:

1. A method of edgewise joining of hollow extruded profile elements, each having opposed edges extending along at least one lateral side edge, for forming long and wide lamella of panel elements, the hollow extruded profile elements being placed in an edge to edge alignment and connected by joining elements, the opposed edges of each hollow extruded profile element each being provided with an edge projection, each edge projection projecting inwardly from one of the opposed edges toward a central portion of the hollow extruded profile element and toward an edge projection diffused on an opposite side of said central portion, and each joining element including U-shaped or C-shaped flanges along opposite edges thereof for interconnecting adjacent hollow extruded profile elements to each other, the method comprising the steps:

positioning the hollow extruded profile elements so as to dispose edge projections of one hollow extruded profiled element in alignment with edge projections of an adjacent hollow extruded profile element; and positioning one joining element such that one of the flanges connects one pair of aligned edge projections of the hollow extruded profile elements and the opposite flange connects the other pair of aligned edge projections of the hollow extruded profile elements, to thereby connect the hollow extruded profile elements to each other.

2. A method according to claim 1, wherein the one joining element is, during the step of positioning, inserted over substantially an entire length of the hollow extruded profile elements, and the hollow extruded profiled elements are metallic.

3. A method according to claim 2, wherein the hollow extruded profile elements are assembled to extend in a common plane.

4. A method according to claim 2, wherein the hollow extruded profile elements are assembled to form a curved structure.

5. A method in accordance with claim 2 wherein:

the hollow extruded profile elements are of aluminum; and the U or C-shaped flanges of the joining elements have an internal width larger than a combined thickness of respective pairs of the aligned edge projections as received between the U or C-shaped flanges.

6. A method in accordance with claim 1 wherein:

one of each pair of aligned edge projections comprises a rib and the other of each pair of aligned edge projections comprises a groove, with the rib and groove of each pair of aligned edge projections being held in surface contact by one joining element.

7. A method in accordance with claim 6 wherein:

each rib and each groove has a radius, with the radius of each rib being smaller than the radius of each groove which is in contact therewith.

8. A method in accordance with claim 6 wherein:

the hollow extruded profile elements are aluminum; and each pair of aligned edge projections has opposed complementary rib and groove formations; and further comprising pushing together the hollow extruded elements when placed in edge to edge alignment; and inserting the joining elements along each pair of the aligned rib and groove formations to connect together the hollow extruded elements which are in edge to edge alignment.

9. A method in accordance with claim 1 wherein:

the hollow extruded profile elements are aluminum; and each pair of aligned edge projections has opposed complementary rib and groove formations; and further comprising pushing together the hollow extruded elements when placed in edge to edge alignment; and inserting the joining elements along each pair of the aligned rib and groove formations to connect together the hollow extruded elements which are in edge to edge alignment.

10. A method in accordance with claim 1 wherein:

the hollow extruded profile elements are of aluminum; and the U or C-shaped flanges of the joining elements have an internal width larger than a combined thickness of respective pairs or the aligned edge projections as received between the U or C-shaped flanges.

11. A method in accordance with claim 1 wherein:

the hollow extruded profile elements are aluminum; and each joining element has a connector web interconnecting opposed U or C-shaped flanges with the connector web having a thickness smaller than a length thereof between the opposed flanges and the thickness is smaller than a width of the U or C-shaped flanges.

* * * * *